United States Patent [19]

Kelly et al.

[11] Patent Number: 5,785,857
[45] Date of Patent: Jul. 28, 1998

[54] MOBILE PROCESS FOR THE RECOVERY OF SPENT HEAT TRANSFER FLUIDS

[75] Inventors: Michael D. Kelly; Hubert E. Brown, Jr., both of Memphis; Joe Nichols Skelley, Germantown, all of Tenn.; George Scott Carpenter, Marion, Ak.

[73] Assignee: Mobile Process Technology, Inc., Memphis, Tenn.

[21] Appl. No.: 740,703

[22] Filed: Oct. 31, 1996

Related U.S. Application Data

[60] Provisional application No. 60/016,576 Apr. 30, 1996.

[51] Int. Cl.$^6$ .................................................. B01D 15/04
[52] U.S. Cl. .................. 210/638; 210/650; 210/669; 210/805; 210/195.2; 210/241
[58] Field of Search .................... 210/638, 650, 210/651, 662, 669, 685, 694, 805, 167, 195.2, 241

[56] References Cited

U.S. PATENT DOCUMENTS

| | | | |
|---|---|---|---|
| 3,732,320 | 5/1973 | Ford | 260/637 R |
| 3,901,810 | 8/1975 | Brooks et al. | 210/500.28 |
| 4,383,920 | 5/1983 | Muller et al. | 210/87 |
| 4,518,396 | 5/1985 | Rawson | 48/127.3 |
| 4,556,492 | 12/1985 | Dickerson et al. | 210/668 |
| 4,659,460 | 4/1987 | Muller et al. | 210/93 |
| 4,692,251 | 9/1987 | Hilgren | 210/651 |
| 4,772,402 | 9/1988 | Love | 210/805 |
| 4,793,403 | 12/1988 | Vataru et al. | 165/95 |
| 4,818,411 | 4/1989 | Dickerson et al. | 210/668 |
| 4,872,997 | 10/1989 | Becker | 210/703 |
| 4,946,595 | 8/1990 | Miller, Jr. | 210/651 |
| 4,995,452 | 2/1991 | Franck et al. | 165/119 |
| 5,091,081 | 2/1992 | Hilgren | 210/195.2 |
| 5,102,503 | 4/1992 | Silinski | 210/241 |
| 5,102,549 | 4/1992 | George et al. | 210/639 |
| 5,104,529 | 4/1992 | Becker | 210/195.1 |
| 5,139,678 | 8/1992 | Frederick, Jr. et al. | 210/641 |
| 5,160,443 | 11/1992 | Mesheau | 210/799 |
| 5,167,826 | 12/1992 | Eaton | 210/651 |
| 5,174,902 | 12/1992 | Shubert et al. | 210/662 |
| 5,194,159 | 3/1993 | George | 210/654 |
| 5,223,144 | 6/1993 | Woyciesjes et al. | 210/664 |
| 5,223,154 | 6/1993 | MacPherson et al. | 210/790 |
| 5,318,700 | 6/1994 | Dixon | 210/167 |
| 5,328,105 | 7/1994 | Sims et al. | 241/46.17 |
| 5,395,514 | 3/1995 | Siegler | 210/85 |
| 5,422,008 | 6/1995 | Woyciesjes et al. | 210/662 |
| 5,429,753 | 7/1995 | Hilgren | 210/805 |

*Primary Examiner*—Ernest G. Therkorn
*Attorney, Agent, or Firm*—Ray F. Cox, Jr.

[57] ABSTRACT

A mobile process to reclaim spent aqueous glycol solutions used as heat transfer fluids and which contains deleterious contaminants, oil/grease, corrosion products, and additives such as buffers and corrosion inhibitors. Particulate contaminates and oil/grease are removed by passing the solution through an ultrafiltration membrane. The dissolved contaminants are removed by passing through a series of ion exchange resin (IER) vessels. The reclaimed glycol solution is reused after replacing the required additives. One embodiment provides for central processing of the filtration and absorption media housed in a mobile enclosure, such as a trailer. The mobile trailer may be used at various collection sites for cleaning and reprocessing spent glycols. After the media are spent, the mobile trailer is returned to a central processing facility for regeneration of the filtration and absorption media. The waste produced by the regeneration is concentrated at a single treatment and disposal facility.

1 Claim, 1 Drawing Sheet

MOBILE PROCESS FOR THE RECOVERY OF SPENT HEAT TRANSFER FLUIDS

This application claims the benefit of U.S. Provisional Application No. 60/016,576 filed Apr. 30, 1996.

BACKGROUND OF THE INVENTION

The present invention relates to a method and apparatus for reclaiming spent aqueous glycol solutions used as heat transfer fluids; for example, automotive antifreeze, and in particular to a method and process which is mobile allowing centralized processing of the spent glycols and centralized regeneration and waste management.

The disposal of spent aqueous glycols is a major problem today, particularly in the case of spent automotive antifreeze solutions. Spent antifreeze solutions, for example, are severely contaminated with particulate materials, such as engine rust particles, oil and grease, and dissolved minerals, including heavy metals which are toxic and hazardous to the environment. Even spent solutions, however, contain usable glycols which are desirable to recycle.

In addition to cleaning the contaminants from the spent antifreeze, recycled antifreeze, in order to be reusable, must be adjusted to the correct concentration of glycol and must have certain additives, such as corrosion inhibitors, replenished.

The final problem with reprocessing spent glycols, particularly used automotive antifreeze, is that used automotive antifreeze is collected at dispersed locations, such as garages, service station and other vehicle maintenance facilities. Small package systems have been introduced to meet this need for processing at the source of the spent antifreeze, but such systems are inherently less efficient than centralized processing facilities. Furthermore, waste disposal is a problem, since some of the waste generated from the cleaning of spent antifreeze may be hazardous from the concentration of heavy metals or other contaminants. (Heavy metals could include lead, arsenic, zinc, copper, and chromium. Other dissolved metals not usually included in the category of heavy metals, such as aluminum, are also found in spent glycol and must be removed as a waste.) It is impractical, for example, for a service station, to acquire a hazardous waste treatment and disposal permit. It is therefore desirable to provide for a method and apparatus to treat spent glycol solutions near the source of the spent glycol while providing the benefits of centralized processing and waste disposal.

Various patented processes are known that use filtration to purify spent antifreeze or other heat transfer fluids. The prior art discloses the use of mechanical filters, centrifuges, ultrafiltration and reverse osmosis. In addition, a number of patents disclose the use of anion and/or cation resins. Furthermore, a number of patents disclose the use of activated carbon for purifying spent glycols or heat transfer fluids.

An example is U.S. Pat. No. 5,422,008 and the closely related U.S. Pat. No. 5,223,144, both of which relate to cleaning recycled antifreeze solutions. They disclose the use of mechanical filters to remove particles down to five microns in size followed by activated carbon, chemical precipitation and ion exchange (anion and/or cation). The use of mechanical filtration down to 0.2 microns in size is suggested as well. These patents disclose small package systems of the type applicable to a single small user. These processes include the step of chemical precipitation which may be undesirable as producing excessive waste for disposal. Further neither suggests the use of ultrafiltration membranes as opposed to mechanical filtration.

To the knowledge of the inventors of the present invention, the prior art does not suggest the desirability of using a mobile facility for processing spent automotive antifreeze, allowing centralized processing and waste disposal. U.S. Pat. No. 5,160,443 discloses the use of an apparatus transportable by a van for recycling contaminated industrial liquids. The particular processing steps disclosed in this patent include the use of fine screen filters and a centrifuge to remove particulate material. The filtering step is then followed by the step of introducing additives to the filtered material. This patent does not disclose the use of ultrafiltration, activated carbon or ion exchange.

These and other disadvantages and limitations of the prior art are addressed by the apparatus and method of the present invention as described below.

SUMMARY OF THE INVENTION

It is an object of this invention to provide a mobile process to efficiently and economically reclaim spent aqueous glycol solutions used as heat transfer fluids. The spent glycol solution contains deleterious contaminants, oil/grease and corrosion products. The solution also contains additives such as buffers and corrosion inhibitors. The present invention removes particulate contaminates and oil/grease by passing the solution through an ultrafiltration membrane process. The dissolved contaminants are then removed by passing through a series of ion exchange resin (IER) vessels. The reclaimed glycol solution can then be reused after replacing the required additives.

This process is an improved process over conventional methods such as distillation since significantly less energy is required, there is less thermal degradation of the glycol, and subsequently less waste is generated. The improved process of the present invention also provides for the central processing of the sorption media which can be accomplished at considerably less cost than at a series of dispersed package facilities.

The filtration and absorption media are housed in a mobile enclosure, such as a trailer. The mobile trailer may then be used at various collection sites for cleaning and reprocessing spent glycols. After the filtration and absorption media are spent, the mobile trailer is then returned to a central processing facility for the efficient regeneration of the filtration and absorption media. Centralized processing in that the waste produced by the regeneration of the filtration and absorption media is concentrated at a single treatment and disposal facility. The centralized processing facilities can be carefully monitored to ensure compliance with local, state and federal environmental regulations. The improved process eliminates the need for capital investment for companies that repackage the recovered heat transfer fluid. The mobile recovery process benefits such applications as process heat transfer fluids, glycols, coolants, lubricants, automotive antifreeze, and adsorbent systems. These terms are considered interchangeable as used herein.

Conventional distillation produces considerable still bottom sludge and is energy and capital intensive. The quality of distilled glycol is difficult to maintain since oil impurities tend to distill with the glycol. The present invention includes the following benefits:

1. Smaller quantities can be treated on a regional basis. This minimizes transportation and capital costs.

2. The mobile ion exchange unit can be utilized at several locations with minimal turn around time and set-up times.

3. A centralized processing facility for regenerating the media provides better economics as well as better control of regenerant wastes.

4. The spent glycol solution collector does not have to spend large amounts of capital and operating expense.

These and other objects and advantages of the present invention will be apparent from a consideration of the detailed description of the preferred embodiments considered in conjunction with the appended drawing as described below:

DETAILED DESCRIPTION OF THE PREFERRED EMBODIMENTS

Figure 1:
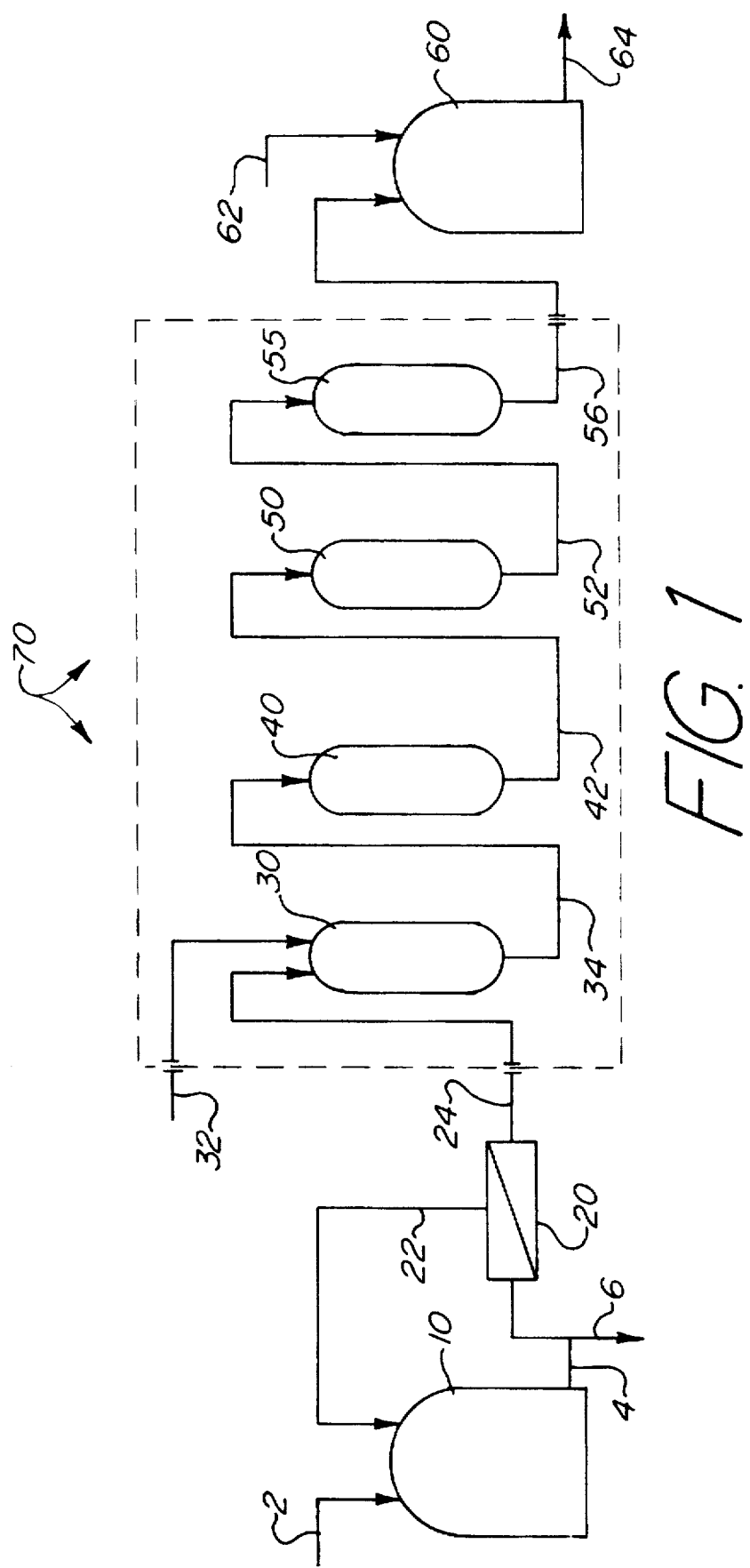
FIG. 1 is a schematic of the process of the present invention.

This process is for reclaiming spent glycol solutions, in particular automotive antifreeze solutions. The invention removes particulate contaminants and oil or grease by passing the glycol through an ultrafiltration membrane. The dissolved contaminants are then removed by passing through a series of ion exchange resins. In a particular embodiment of the present invention, the spent glycol passes through a membrane filter, an activated carbon column, a cation resin, and an anion resin. After the cleaning process, additives may be introduced to the cleaned glycol. The purification equipment is housed in a mobile trailer allowing regeneration and disposal of waste at a central processing facility.

The invention is described with reference to FIG. 1. Collection vessel 10 serves as a collection reservoir for the spent glycol solution 2.

Filter 20 separates particulates and oil/grease from the input spent glycol solution 2. Filter 20 is desirably a membrane filtration system which includes but is not limited to, a spiral wound or tubular membrane. The membrane can consist of a polymeric, ceramic or powdered metal material. Filter 20 removes particulate material and oil and grease from the collected spent glycol 4. Collected spent glycol solution 4 from collection vessel 10 is presented to the filter 20. Recirculated fluid 22 is returned to the collection vessel 10. The concentrated spent and sludge may be removed from the system by drain 6. Permeate 24 is passed to granular activated carbon column (GAC) 30.

GAC column 30 contains an activated carbon media which adsorbs trace oil and grease and dyes that are not removed by membrane filter 20. Rinse water is introduced through conduit 32. The rinse water is required at the end of treatment of each batch to flush out any residual spent glycol solution.

Pipe 34 passes the glycol solution through cation vessel 40. Cation vessel 40 contains a cation form of ion exchange resin. Cation vessel 40 removes dissolved cationic impurities such as sodium, calcium, magnesium and certain heavy metal corrosion products.

Effluent from cation vessel 40 passes by means of pipe 42 to anion vessel 50 which contains a weak base anion IER. Anion vessel 50 removes additive constituents such as but not limited to, phosphates, chlorides, nitrates, borates, nitrites and sulfates and degradation products such as but not limited to, formates, acetates, glycolates, nitrates and nitrites.

Effluent from anion vessel 50 passes by means of pipe 52 anion vessel 55 which contains a strong base anion IER. Anion vessel 55 removes additional constituents such as but not limited to borate and nitrite and degradation products such as but not limited to formates, acetates, and glycolates.

Effluent from anion vessel 55 passes by means of pipe 56 to storage vessel 60. Storage vessel 60 receives the purified glycol solution. The purified glycol solution stored in storage vessel 60 typically will not have sufficient glycol content for heat transfer applications. Additional glycol is added to the purified glycol solution in storage vessel 60 via conduit 62. Additive chemicals may also be introduced via conduit 62. When the appropriate amount of glycol and additives are thoroughly mixed (mixing step not shown in FIG. 1), the purified glycol solution with additional glycol and additives is then ready for its intended use and may be removed via output line 64.

In the preferred embodiment of the present invention, the GAC column 30, cation vessel 40 and anion vessels 50, 55 are enclosed within a mobile enclosure 70. The typical mobile enclosure 70 will be a commercial trailer with an overall length of about forty-five (45) feet, a width of about eight and one-half (8½) feet and a height of about thirteen and one-half (13½) feet. Vessels 30, 40, 50, 55 are so constructed to allow for each to be moved into or out of the mobile enclosure 70 with a common forklift truck which allows for sluice in and out for regeneration service. Multiples of vessels 30, 40, 50, 55 can be loaded in the mobile enclosure 70 to provide maximum capacity. Interconnecting piping, hoses and quick connect couplings are located inside the mobile enclosure 70. In a typical application, the filter 20 may be left at the site where the spent glycol is collected, so that only the vessels 30, 40, 50, 55 need to be returned to a central processing point for regeneration of the activated carbon, and the ion exchange resins and associated disposal of the regenerant containing heavy metals and other contaminants.

What is claimed is:

1. A mobile process for the recovery of spent aqueous glycol solutions used as heat transfer fluids, the spent aqueous glycol solutions being characterized by having contaminants including particulates, oil/grease, and dissolved minerals and deficiencies in glycol concentration and in additives such as buffers and corrosion inhibitors, comprising the steps of:

(a) accumulating spent aqueous glycol solutions at a plurality of dispersed locations;

(b) transporting a mobile enclosure to at least one of said dispersed locations, said mobile enclosure having means disposed therein for recovery of said spent aqueous glycol solution including particulate removal means, oil/grease removal means, dissolved mineral removal means, glycol addition means, and additive addition means;

(c) passing said spent glycol solution through said particulate removal means;

(d) passing said spent glycol solution through said oil/grease removal means;

(e) passing said spent glycol solution through said dissolved mineral removal means;

(f) adjusting the concentration of glycol in said spent glycol solution by adding glycol to eliminate any deficiency in glycol concentration;

(g) adding any required additives to said spent glycol solution;

(h) dispensing said glycol solution after processing to said dispersed location;

(i) periodically returning said mobile enclosure to a centralized processing facility;

(j) regenerating said particulate removal means, said oil/grease removal means, and dissolved mineral removal means at said centralized processing facility; and (k) treating and disposing of waste produced by regenerating said particulate removal means, said oil/grease removal means, and dissolved mineral removal means at said centralized processing facility.

\* \* \* \* \*